“United States Patent Office” — 2,771,489 — Patented Nov. 20, 1956

2,771,489
CHEMICAL PROCESS

Ludwig F. Audrieth, Urbana, Ill., and Earle S. Scott, Amherst, Mass., assignors to University of Illinois Foundation, Urbana, Ill., a corporation of Illinois No Drawing. Application November 14, 1955,
Serial No. 546,834

3 Claims. (Cl. 260—552)

This invention relates generally to thiosemicarbazide and more particularly to an improved method for making the same. This application is a continuation-in-part of our co-pending application Serial Number 357,622, filed May 26, 7953, now abandoned, and sets forth data corroborating the advantageous results obtained by the invention and distinguishing from the art.

Thiosemicarbazide has been prepared heretofore by a method involving a plurality of steps wherein hydrazine thiocyanate is formed by reacting hydrazine sulfate with potassium thiocyanate, precipitating potassium sulfate from the reaction mixture by adding a ketone thereto and thereafter bringing about rearrangement of the resulting hydrazine thiocyanate by heating and evaporating the reaction liquor. Such a conversion process is very difficult to control and the reaction sometimes reaches explosive violence. It has been suggested in U. S. Patent 2,450,406 that this type of process can be improved by removing the water from the reaction liquor and conducting the rearrangement of the hydrazine thiocyanate into thiosemicarbazide in an organic solvent such as methyl Cellosolve. This improved process has the disadvantages of involving a plurality of steps and utilization of costly organic solvents.

Swimmer in U. S. Patent 2,710,243 discloses the process for making thiosemicarbazide which involves forming hydrazine thiocyanate by reacting equimolecular proportions of ammonium thiocyanate and hydrazine. Swimmer brings about the reaction between hydrazine and ammonium thiocyanate in a very concentrated solution and by means of a series of evaporation procedures. According to his method several evaporations or "boildowns" are required to produce thiosemicarbazide in suitable yields. In accordance with one of the procedures disclosed, for example, a total of five "boildowns" are run in order to bring about the reaction and subsequent rearrangement of the hydrazine thiocyanate into thiosemicarbazide. Such a process is costly, time consuming and not suitable for plant scale production.

It is, therefore, an object of this invention to provide an improved process for preparing thiosemicarbazide devoid of the foregoing disadvantages. Another object of the invention is to provide a simplified and improved process for preparing thiosemicarbazide from hydrazine and ammonium thiocyanate. A still further object of this invention is to provide a process for making thiosemicarbazide adaptable for use commercially. Another object of the invention is to provide a process for making thiosemicarbazide in aqueous solution without the necessity of using an organic solvent.

The foregoing objects as well as others are accomplished in accordance with this invention, generally speaking, by heating a solution of hydrazine and a substantial excess of ammonium thiocyanate, and continuing to heat the resulting solution of hydrazine thiocyanate while it has ammonium thiocyanate dissolved therein until the hydrazine thiocyanate is rearranged into thiosemicarbazide. It has been found that the yield of thiosemicarbazide is much greater when the rearrangement of hydrazine thiocyanate is conducted in a solution thereof which contains a substantial amount of ammonium thiocyanate than when no ammonium thiocyanate is present, as would be the case if equimolecular proportions of hydrazine and ammonium thiocyanate are used. The reaction proceeds most rapidly if the reaction mixture is maintained near its boiling point. For best results, it is preferred to heat the mixture to its boiling point and to continue to heat it under reflux for from one and one-half hours to about three hours. The ratio of ammonium thiocyanate to hydrazine before any reaction to form hydrazine thiocyanate should be at least about two mols ammonium thiocyanate per mol of hydrazine to insure the presence of sufficient ammonium thiocyanate without additions thereof during the rearrangement. The yield of thiosemicarbazide is adversely affected if less than about two mols ammonium thiocyanate is used.

By using more than equimolecular proportions of ammonium thiocyanate to hydrazine when the reaction liquor is prepared, hydrazine thiocyanate is formed and is then rearranged into thiosemicarbazide without any intermediate filtering steps and without any evaporation steps being required. Either substantially anhydrous hydrazine or aqueous solutions of hydrazine or hydrazine hydrate can be used as the raw material since the reaction can be carried out in aqueous solution.

It is believed that one of the functions the ammonium thiocyanate performs is to adjust and maintain the pH of the solution above pH 7 where the conversion of hydrazine thiocyanate to thiosemicarbazide takes place most readily. The initial pH of the reaction mixture is about pH 8 but the hydrogen ion concentration of the mixture changes to about pH 7 before completion of the reaction. Actually, the drop in hydrogen ion concentration takes place at the very beginning of the reaction because a large share of the ammonium which is displaced by the hydrazine is evolved almost immediately.

Thiosemicarbazide precipitates from the reaction mixture as it cools below the boiling point thereof and the crystals thus formed can be separated from the liquid phase by filtering, centrifuging or other suitable means. The crude crystals can be separated from impurities therein by recrystallization from a suitable solvent, for example, by dissolving them in an aliphatic alcohol like ethyl alcohol or any other suitable water miscible solvent and thereafter diluting the resulting solution with a non-solvent such as water to precipitate the thiosemicarbazide. Costly and troublesome evaporation processes are avoided.

In order to describe more fully and further to clarify the invention, the following is a typical embodiment thereof:

About 200 grams of ammonium thiocyanate, about 59 milliliters of an aqueous solution containing 85% hydrazine hydrate, and 25 milliliters of water are refluxed for about three hours under an atmosphere of nitrogen. By using the quantities of ammonium thiocyanate and hydrazine hydrate specified, a solution containing about 2.6 mols ammonium thiocyanate and one mol hydrazine is obtained. The reaction liquor is then filtered while at a temperature near its boiling point to remove any sulfur therefrom and is subsequently permitted to cool to room temperature or to about 20° C. The resulting precipitate of thiosemicarbazide is separated from the liquid phase by filtering or other suitable means. The crude material is dissolved in a mixture of about 50 parts ethyl alcohol and 50 parts water. The resulting solution is then diluted with water until all of the thiosemicarbazide precipitates therefrom. A yield of about 51 grams of pure thiosemicarbazide having a melting point of about 180° C. is obtained. This corresponds to a yield of about 56% based upon the amount of hydrazine used.

The following table indicates the importance of having ammonium thiocyanate present in the reaction liquor during the rearrangement of the hydrazine thiocyanate into thiosemicarbazide. In these experiments all of the ammonium thiocyanate to be used in the process was dissolved in the solution before the reaction between the hydrazine and ammonium thiocyanate was begun.

TABLE

*Effect of ammonium thiocyanate to hydrazine molar ratio upon yield of thiosemicarbazide*

| Mol Ratio Ammonium Thiocyanate to Hydrazine | Percentage Yield |
|---|---|
| 0.5 | None |
| 1.0 | 23.0 |
| 2.0 | 45 |
| 2.0 | 45 |
| 3.0 | 48 |

The foregoing data indicates that maximum yields are obtained when more than equimolecular proportions of ammonium thiocyanate and hydrazine are utilized. More than about three mols of ammonium thiocyanate per mol of hydrazine does not appear to bring about any appreciable increase in yield so ordinarily not more than three mols will be utilized.

While the invention has been described in detail in the foregoing, some variations can be made in the process without adversely affecting the quality of the thiosemicarbazide or deleteriously affecting the yield thereof. For instance, the product as obtained as a reaction product without any purification treatment is suitable for some purposes and the purification step in such instances can be eliminated. If the crystals are purified other solvents such as, for example, methyl alcohol, propyl alcohol and the like can be utilized.

Although the process has been described as a batch process, the reaction liquor remaining after the removal of the thiosemicarbazide can be employed in preparing reaction liquor for subsequent batches or a continuous process can be employed. It is preferred to conduct the reaction under a suitable inert atmosphere like nitrogen but it can be conducted in any other suitable inert or non-oxidizing atmosphere or even in air.

Still other variations in the invention will become apparent to those skilled in the art and can be made therein without departing from the scope and spirit thereof.

Having thus described the invention, what is claimed and desired to secure by Letters Patent is:

1. The process which comprises heating under reflux an aqueous solution containing ammonium thiocyanate and hydrazine in the ratio of from about two to about three mols ammonium thiocyanate per mol of hydrazine, cooling the solution, and thereafter separating the resulting thiosemicarbazide from the reaction liquor.

2. In a process for making thiosemicarbazide by heating an aqueous solution of hydrazine and ammonium thiocyanate and thereafter separating the resulting crystals or thiosemicarbazide from the reaction liquor, the improvement in which the heating is carried out under reflux and the solution contains from about two mols to about three mols of ammonium thiocyanate per mol hydrazine.

3. In a process for making thiosemicarbazide the step of boiling and refluxing hydrazine thiocyanate in an aqueous solution containing from about 1 to about 2 mols of ammonium thiocyanate until the hydrazine thiocyanate is rearranged into thiosemicarbazide.

References Cited in the file of this patent

UNITED STATES PATENTS 2,710,243    Swimmer _____ June 7, 1955